US012783252B2

(12) United States Patent
Nie et al.

(10) Patent No.: US 12,783,252 B2
(45) Date of Patent: Nov. 3, 2026

(54) TERMINAL FIRMWARE STARTUP METHOD AND APPARATUS, ELECTRONIC DEVICE, AND STORAGE MEDIUM

(71) Applicant: Beijing Bytedance Network Technology Co., Ltd., Beijing (CN)

(72) Inventors: Haitao Nie, Beijing (CN); Shijian Ge, Beijing (CN); Xiaohan Xu, Beijing (CN); Liang Peng, Beijing (CN); Yu Zhang, Beijing (CN); Jian Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 175 days.

(21) Appl. No.: 18/713,514

(22) PCT Filed: Nov. 18, 2022

(86) PCT No.: PCT/CN2022/132852
§ 371 (c)(1),
(2) Date: May 24, 2024

(87) PCT Pub. No.: WO2023/093633
PCT Pub. Date: Jun. 1, 2023

(65) Prior Publication Data
US 2025/0013474 A1 Jan. 9, 2025

(30) Foreign Application Priority Data
Nov. 25, 2021 (CN) ........................ 202111413376.1

(51) Int. Cl.
*G06F 9/4401* (2018.01)

(52) U.S. Cl.
CPC ................................. *G06F 9/4406* (2013.01)

(58) Field of Classification Search
None
See application file for complete search history.

(56) References Cited

U.S. PATENT DOCUMENTS 8,028,155 B1 9/2011 Righi et al.
8,499,142 B1 7/2013 Ramamurthy et al.
(Continued)

FOREIGN PATENT DOCUMENTS

CN 104133706 A 11/2014
CN 108073420 A 5/2018
(Continued)

OTHER PUBLICATIONS

"Linux as Firmware", LinuxBoot, Jan. 2017, pp. 1-2.
(Continued)

*Primary Examiner* — Fahmida Rahman

(57) ABSTRACT

The present disclosure relates to a terminal firmware startup method and apparatus, an electronic device, and a storage medium. The startup method includes: replacing a target feature program in initial firmware with a target loader to obtain target firmware; loading hardware code in the target firmware that is used for initializing core hardware to complete hardware initialization, and generating a hardware initialization complete instruction; loading the target loader according to the hardware initialization complete instruction to complete platform initialization, and generating an operating system startup signal; and starting an operating system.

20 Claims, 3 Drawing Sheets

(56) References Cited

U.S. PATENT DOCUMENTS

| | | | | |
|---|---|---|---|---|
| 10,282,190 | B2 * | 5/2019 | Dailey | G06F 8/654 |
| 2006/0149955 | A1 | 7/2006 | Velhal et al. | |
| 2012/0316658 | A1 | 12/2012 | Glew | |
| 2016/0004542 | A1 * | 1/2016 | Das | G06F 9/4405 713/2 |
| 2017/0039053 | A1 * | 2/2017 | Siluvainathan | G06F 9/4401 |
| 2021/0286692 | A1 * | 9/2021 | Chien | G06F 11/2284 |
| 2023/0096832 | A1 * | 3/2023 | Mohalik | G06F 8/61 717/168 |

FOREIGN PATENT DOCUMENTS

| | | | |
|---|---|---|---|
| CN | 108279935 | A | 7/2018 |
| CN | 109101284 | A | 12/2018 |
| CN | 114090090 | A | 2/2022 |

OTHER PUBLICATIONS

"UEFI Specs and Test Tools", Unified Extensible Firmware Interface Forum, Aug. 29, 2022, pp. 1-1.

"What is Tianocore", tianocore, Jun. 2004, pp. 1-1.

International Search Report and Written Opinion received for PCT Patent Application No. PCT/CN2022/132852, mailed on Jan. 19, 2023, 19 pages (3 pages of English Translation and 3 pages of Original Document).

Jarlstrom, "Minimum Platform: Open Source UEFI Firmware for Intel® Architecture Platforms", May 22, 2024, pp. 1-2.

Notice of Allowance received from Chinese patent application No. 202111413376.1 mailed on Feb. 26, 2024, 6 pages (2 pages English Translation and 4 pages Original Copy).

Office action received from Chinese patent application No. 202111413376.1 mailed on Oct. 27, 2023, 17 pages (7 pages English Translation and 10 pages Original Copy).

* cited by examiner

TERMINAL FIRMWARE STARTUP METHOD AND APPARATUS, ELECTRONIC DEVICE, AND STORAGE MEDIUM

CROSS-REFERENCE TO RELATED APPLICATION

The present application is a U.S. National Phase Entry of International Application No. PCT/CN2022/132852 filed on Nov. 18, 2022. The present application claims priority to and the benefit of the above-identified application and the above-identified application is incorporated by reference herein in its entirety.

TECHNICAL FIELD

The present disclosure relates to the field of operating systems, and specifically, to a terminal firmware startup method and apparatus, an electronic device, and a storage medium.

BACKGROUND

Firmware exists between hardware and an operating system (OS), and mainly functions to initialize various core hardware, such as a processing central unit (CPU), a chipset, a memory, and a PCIe solid state disk, and load and start the operating system.

Currently, for most server development modes, a silicon vendor develops, based on a chip architecture, a codebase B to initialize various core hardware functions, and a firmware vendor (independent BIOS vendor, IBV) develops a codebase A of a platform based on the codebase B from the silicon vendor, and uses the codebase A to develop a loading solution for loading the operating system. Current firmware startup solutions are all firmware startup solutions provided by the IBV, in which the operating system is usually loaded using a TianoCore+unified extensible firmware interface (UEFI) solution. However, many function modules of UEFI firmware are not easily customized. As a result, the firmware startup solution provided by the IBV cannot meet a function customization requirement of a terminal user.

SUMMARY

This section is provided to give a brief overview of concepts, which will be described in detail later in the section DETAILED DESCRIPTION. This section is neither intended to identify key or necessary features of the claimed technical solutions, nor is it intended to be used to limit the scope of the claimed technical solutions.

According to a first aspect, the present disclosure provides a terminal firmware startup method. The method includes:

- replacing a target feature program in initial firmware with a target loader to obtain target firmware;
- loading hardware code in the target firmware that is used for initializing core hardware to complete hardware initialization, and generating a hardware initialization complete instruction;
- loading the target loader according to the hardware initialization complete instruction to complete platform initialization, and generating an operating system startup signal; and
- starting an operating system based on the operating system startup signal.

According to a second aspect, this embodiment provides a terminal firmware startup apparatus. The apparatus includes:

- an obtaining module configured to replace a target feature program in initial firmware with a target loader to obtain target firmware;
- a loading module configured to load hardware code in the target firmware that is used for initializing core hardware to complete hardware initialization, and generate a hardware initialization complete instruction;
- a generation module configured to load the target loader according to the hardware initialization complete instruction to complete platform initialization, and generate an operating system startup signal; and
- a startup module configured to start an operating system based on the operating system startup signal.

According to a third aspect, the present disclosure provides a computer-readable medium having a computer program stored thereon, where when the program is executed by a processing apparatus, the steps of the method in the first aspect are implemented.

According to a fourth aspect, the present disclosure provides an electronic device. The electronic device includes:

- a storage apparatus having a computer program stored thereon; and
- a processing apparatus configured to execute the computer program in the storage apparatus to implement the steps of the method according to the first aspect.

The other features and advantages of the present disclosure will be described in detail in the following section DETAILED DESCRIPTION.

BRIEF DESCRIPTION OF DRAWINGS

The above and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale. In the accompanying drawings.

DETAILED DESCRIPTION

Figure 1:
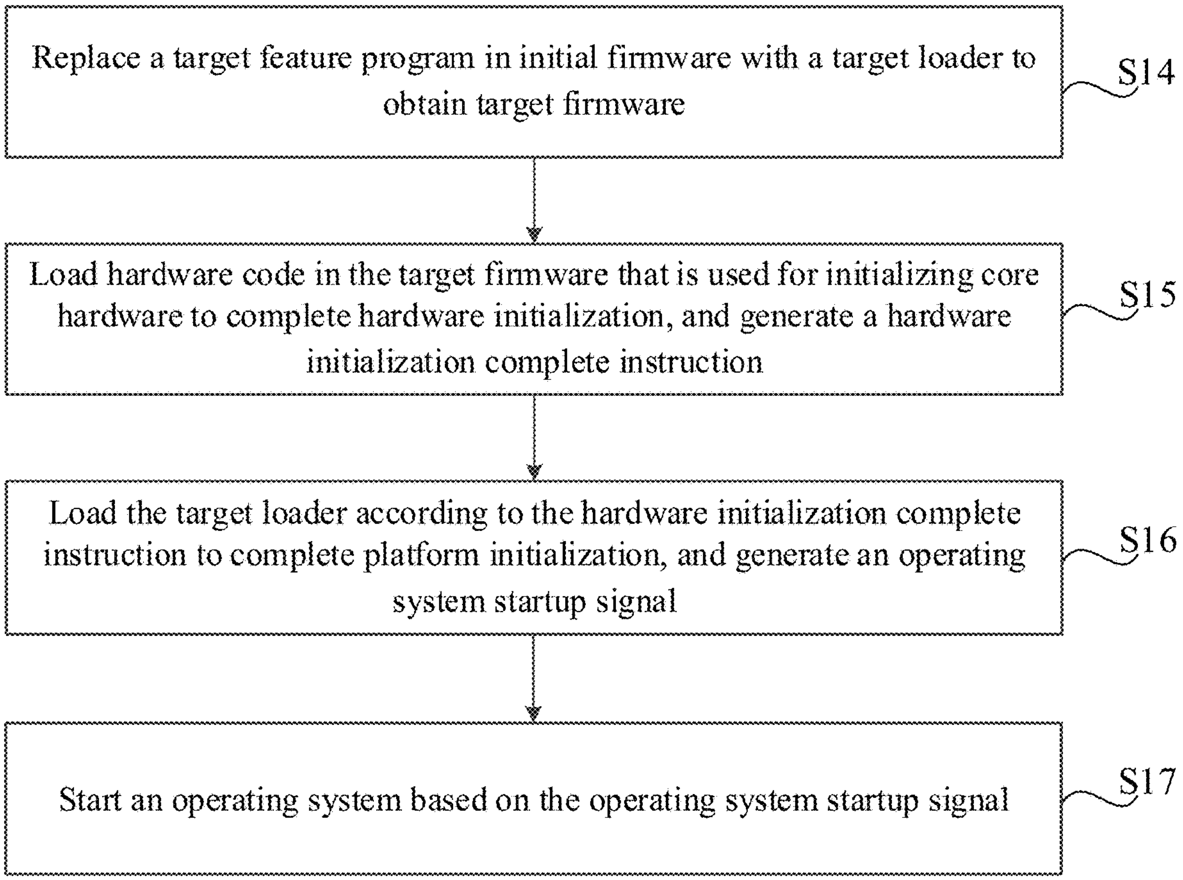
FIG. 1 is a flowchart of a terminal firmware startup method according to an example embodiment.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that steps described in method implementations of the present disclosure may be performed in different orders, and/or performed in parallel. Furthermore, additional steps may be included and/or execution of the illustrated steps may be omitted in the method implementations. The scope of the present disclosure is not limited in this respect.

The term "include/comprise" used herein and variations thereof are an open-ended inclusion, namely, "include/comprise but not limited to". The term "based on" is "at least partially based on". Related definitions of the other terms will be given in the description below.

It should be noted that concepts such as "first" and "second" mentioned in the present disclosure are only used to distinguish between different apparatuses, modules, or units, and are not used to limit the sequence or interdependence of functions performed by these apparatuses, modules, or units. In addition, it should be noted that the modifiers "a/an" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

The current firmware startup solutions are all firmware startup solutions provided by an IBV, which are generally TianoCore+UEFI solutions. However, due to an inactive UEFI community and accordingly fewer UEFI firmware engineers, there are limited UEFI firmware resources. Many function modules of UEFI firmware are limited only to the IBV, resulting in an inability to repair the firmware in a timely manner when there is a problem with the firmware. In addition, content of the UEFI firmware is stereotyped, and features integrated into the UEFI firmware are bloated. Some of the feature programs are useless to existing terminal users, while some feature programs that are urgently needed by users are not integrated, causing a lack of functions. Consequently, the current firmware startup solution provided by the IBV cannot meet function customization requirements of different terminal users.

In view of this, an embodiment of the present disclosure provides a terminal firmware startup method to provide a new firmware startup solution. A bloated feature program in initial firmware is replaced with a target loader, where the replaced feature program may be a program that is useless to users, and the target loader is a program that is determined according to user requirements. Therefore, starting firmware based on the target loader improves the flexibility of firmware startup, and the firmware startup is no longer limited to a fixed startup solution from a firmware vendor, thereby providing a more flexible and convenient firmware startup policy for users.

FIG. 1 is a flowchart of a terminal firmware startup method according to an example embodiment. Referring to FIG. 1, the terminal firmware startup method may include the following steps.

Step S14: Replace a target feature program in initial firmware with a target loader to obtain target firmware.

Step S15: Load hardware code in the target firmware that is used for initializing core hardware to complete hardware initialization, and generate a hardware initialization complete instruction.

Step S16: Load the target loader according to the hardware initialization complete instruction to complete platform initialization, and generate an operating system startup signal.

Step S17: Start an operating system based on the operating system startup signal.

Figure 2:
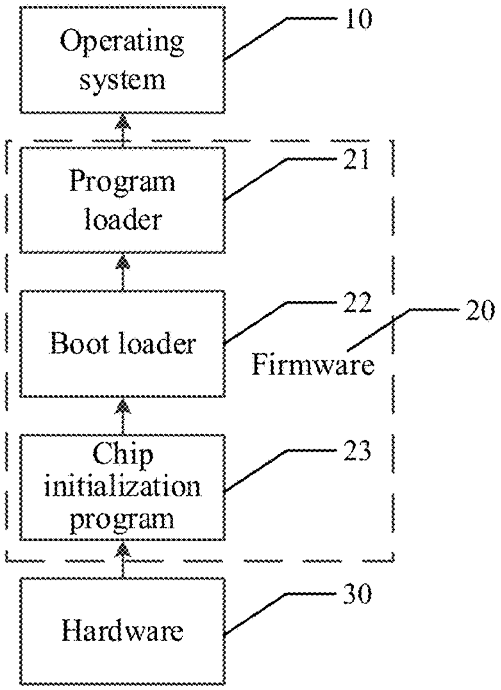
FIG. 2 is a schematic flowchart of another terminal firmware startup method according to an example embodiment.

It may be first understood that as a special program existing between hardware and an operating system of a terminal device, firmware is stored in an electrically erasable read-only memory of the terminal device, and mainly serves to complete initialization of an internal platform of the terminal device after the terminal device is powered on, and start a corresponding operating system, so as to implement a function of the operating system. FIG. 2 is a schematic flowchart of another terminal firmware startup method according to an example embodiment. As shown in FIG. 2, the firmware may be functionally divided into three function modules, namely, a chip initialization program (silicon code) at a lower layer for initializing a chip, a boot loader at an intermediate layer for booting a platform initialization program and a platform building program in the firmware, and a program loader (OS loader) at an upper layer for loading a platform program to implement platform initialization and platform building. After hardware is powered on, the firmware successively uses the silicon code, the boot loader, and the OS loader, to implement platform initialization and platform building, and the operating system is finally started, to implement installation of the terminal device for use.

In a development phase of the terminal device, based on a codebase B that is developed by a silicon vendor based on a chip architecture thereof to initialize core hardware, a firmware vendor develops a codebase A for building and initializing the platform, and then configures the silicon code, the boot loader, and the OS loader based on the codebase A to complete firmware startup solution matching. Then, a board-level vendor completes a connection between various hardware according to adaptation rules for the hardware, to implement a board-level functional adaptation, thereby completing the building of the terminal device. During this process, a firmware startup solution is determined by an IBV. Based on a requirement of a service type, the IBV uses TianoCore in a boot loader stage and a UEFI in an OS loader stage, thereby forming initial firmware based on silicon code+UEFI+TianoCore. However, UEFI-based initial firmware is single-core single-thread firmware, and the initial firmware includes many feature programs that users may not use, which results in bloated initial firmware and low running efficiency, failing to meet a customization requirement of the terminal user.

For example, in this embodiment, the target loader is Linux binary (also referred to as Linux boot). As one of the most active operating systems currently, Linux may support different programming languages, and many solutions to operating system faults may be derived based on the Linux system. Sinking the Linux system into a firmware solution makes it possible that in the case of a firmware startup failure, a terminal user can make a quick response to the failure and solve a problem based on Linux, without relying on the IBV to troubleshoot the operating system based on a UEFI system in the initial firmware any more. A feature program, which may not be frequently used by the user and may be replaced without affecting a firmware function, in the initial firmware provided by the IBV is determined, and the feature program is replaced with a feature program that better meets user requirements, to generate the target firmware, such that the Linux system can be sunken into the initial firmware.

In some embodiments, step S14 may include the following steps.

Step S141: Select a storage space of a preset size from a specified region of the initial firmware.

Step S142: Replace a target feature program in the storage space with Linux binary, and use the Linux binary as the target loader.

Figure 3:
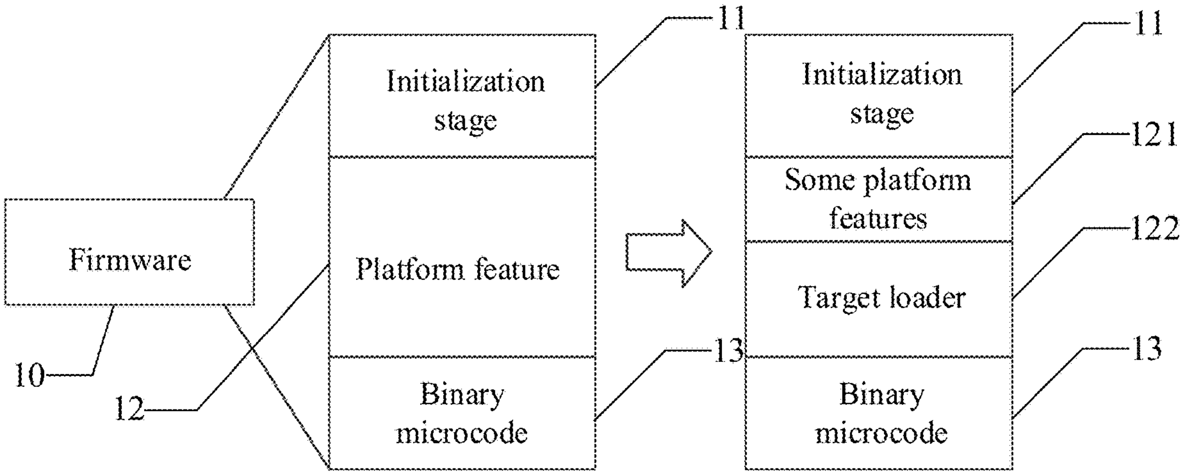
FIG. 3 is a schematic diagram showing the generation of target firmware according to an example embodiment.

FIG. 3 is a schematic diagram showing the generation of target firmware according to an example embodiment. For example, as shown in FIG. 3, in this embodiment, the silicon code+UEFI+TianoCore startup solution is used for the initial firmware. However, the initial firmware may include some features that the user may not use, which are stored in a firmware region of the initial firmware. A menu feature (setup menu), a network stack, and a dial-up Internet access feature (Adv RAS feature) among these features are replaced with the Linux binary, such that the Linux system is sunken into the initial firmware. It may be understood that the setup menu and the Adv RAS feature are basically not used by users on the Internet, and the use of the network stack for terminal installation may be implemented in the Linux binary. Therefore, replacing the setup menu, the network stack, and the Adv RAS feature with the Linux binary has no impact on the system stability and usability, and can also sink the more convenient and easier Linux system into the initial firmware.

In some embodiments, before step S14, the startup method may further include the following steps.

Step S11: Obtain an initial codebase.

Step S12: Obtain, based on the initial codebase, a target codebase corresponding to a platform.

Step S13: Generate the initial firmware based on information about a customization requirement of the platform and the target codebase.

It may be understood that the codebase B developed by the silicon vendor based on the chip architecture thereof is the initial codebase, which is merely code developed to initialize a core function of the core hardware. The initial codebase needs to be adaptively transformed for different platforms, to form target codebases matching the platforms. Based on different customization requirements for the same platform, such as stress test and installation, different firmware startup solutions need to be set accordingly, and the initial firmware is generated based on the information about the customization requirement of the platform and the target codebase, such that the initial firmware can better adapt to different function requirements of users.

For example, in step S15, a power-on signal is transmitted to the target firmware through the hardware based on a start switch of the terminal device. The target firmware calls the silicon code stored in a medium based on the power-on start signal, to perform initialization settings on the core hardware, such as a CPU, a chipset, and a mainboard, of the terminal device. After all core hardware is initialized, the corresponding hardware initialization complete instruction is generated and transmitted to the boot loader of the firmware, such that the boot loader initiates the calling of the platform program.

For example, in step S16, after receiving the hardware initialization complete instruction, the boot loader in the target firmware calls the target loader for initializing the platform, and completes initialization of the platform based on the target loader. It may be understood that through the above steps, the target loader at this time is the Linux binary, and the boot loader directly calls the Linux binary during program calling, and executes the Linux binary based on the Linux system to complete initialization settings of the platform. Therefore, when the firmware starts, the UEFI system is directly skipped and the Linux system is used to complete the platform initialization, and the operating system startup signal is generated.

In some embodiments, step S16 may include the following steps.

Step S161: Obtain a target boot loader from the target firmware according to the hardware initialization complete instruction.

Step S162: Obtain the target loader based on the target boot loader.

Step S163: Load the target loader to complete the platform initialization, and generate the operating system startup signal.

For example, in this embodiment, the startup solution based on the silicon code, the boot loader, and the OS loader is used for the target firmware. The target boot loader is enabled according to the hardware initialization complete instruction, and the corresponding loader is obtained from the target firmware based on the boot loader. It may be understood that when booting the loader, the boot loader may boot the target loader (the Linux binary) in the target firmware and boot the Linux Binary into the OS loader, and the Linux binary is executed such that the target firmware completes the platform initialization based on the Linux system, and the corresponding operating system startup signal is generated.

In some embodiments, step S16 may include the following steps.

Step S164: Search for at least one payload in the target loader in parallel according to the hardware initialization complete instruction.

Step S165: Start the at least one payload in parallel to complete the platform initialization.

Step S166: Generate the operating system startup signal.

For example, in this embodiment, after the initialization complete instruction is received, the Linux system is sunken into the initial firmware based on the target load system to generate the target firmware, and the firmware is started based on the Linux system. In addition, the Linux binary in the Linux system may perform multi-core parallel computing, to run a multi-user, multi-task and multi-thread operating system based on a plurality of CPUs of the terminal device. Therefore, when the target firmware has found a plurality of payloads in a plurality of hardware devices in parallel in the Linux system, it indicates that the firmware at this time needs to perform a multi-core and multi-thread startup. Then, the plurality of payloads that have been found are simultaneously started to implement a multi-thread startup operation to complete the platform initialization, and the corresponding operating system startup signal is generated.

For example, in step S17, after the target firmware is started, a driver execution environment in the terminal device has been built. In this case, a device selection is started to select a hardware device that needs to be started, and the operating system is finally started through the operating system loader.

In some embodiments, before step S14, the startup method further includes the following steps.

Step S112: Obtain a function mode corresponding to the initial firmware.

Step S113: Obtain the target loader based on the function mode.

It may be understood that different terminal devices correspond to different firmware application functions. For example, for an operating system of a bank, etc. that requires higher security, a corresponding firmware startup solution needs to be adjusted for security. Alternatively, for a server operating system that carries a large number of users, higher system stability is required, and a corresponding firmware startup solution needs to be adjusted and adapted for stability detection of the operating system. For example, different function modes may be correspondingly set for different firmware functions according to actual application requirements, and different target loaders may be set for different function modes, to implement corresponding functions. After the function mode corresponding to the initial firmware is determined, the target loader corresponding to the function mode is determined based on a mapping relationship, and the target loader is sunken into the firmware through subsequent steps, such that the firmware implements a specific function.

With the above technical solution, the terminal firmware startup method may be provided, in which method the target feature program in the initial firmware is replaced with the target loader to obtain the target firmware; the hardware code in the target firmware that is used for initializing the core hardware is loaded to complete the hardware initialization, and the hardware initialization complete instruction is generated; the target loader is loaded according to the hardware initialization complete instruction to complete the platform initialization, and the operating system startup signal is generated; and the operating system is started. In this way, a feature program in the initial firmware can be replaced with the target loader, and the firmware is then started based on the target loader. Because the target loader can implement flexible customization of a function as required, the firmware can be started more flexibly. Compared with a conventional UEFI startup solution, the present technical solution is more convenient and flexible, providing a more convenient firmware solution for users.

Figure 4:
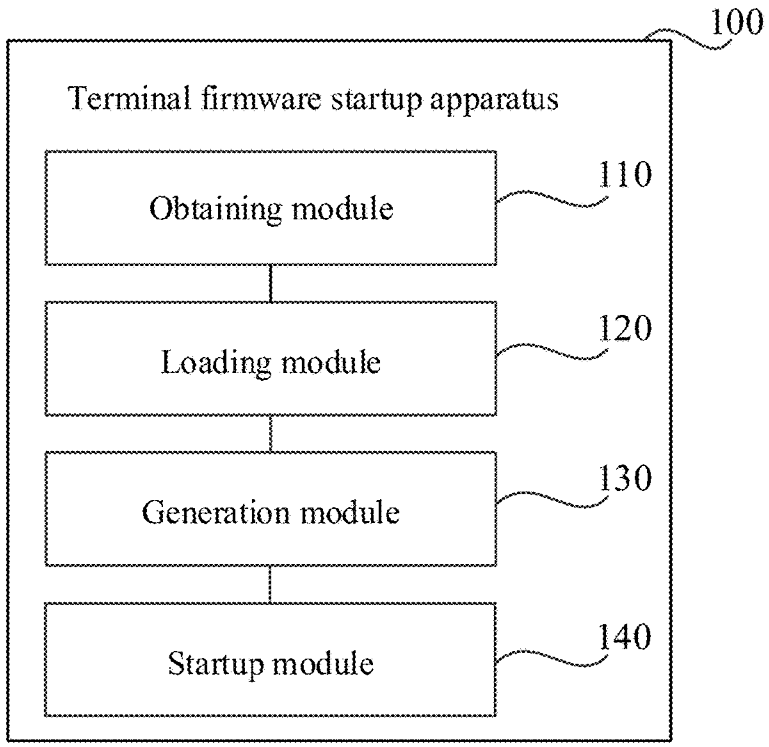
FIG. 4 is a block diagram of a structure of a terminal firmware startup apparatus according to an example embodiment.

Based on the same concept, the present disclosure further provides a terminal firmware startup apparatus. The apparatus may be part or all of an electronic device by means of software, hardware, or a combination thereof. Referring to FIG. 4, the terminal firmware startup apparatus 100 includes:

- an obtaining module 110 configured to replace a target feature program in initial firmware with a target loader to obtain target firmware;
- a loading module 120 configured to load hardware code in the target firmware that is used for initializing core hardware to complete hardware initialization, and generate a hardware initialization complete instruction;
- a generation module 130 configured to load the target loader according to the hardware initialization complete instruction to complete platform initialization, and generate an operating system startup signal; and
- a startup module 140 configured to start an operating system based on the operating system startup signal.

In some embodiments, the generation module 130 may be configured to:

- obtain a target boot loader from the target firmware according to the hardware initialization complete instruction;
- obtain the target loader based on the target boot loader; and
- load the target loader to complete the platform initialization, and generate the operating system startup signal.

In some embodiments, the startup apparatus 100 further includes:

- a first obtaining module configured to obtain an initial codebase before the target feature program in the initial firmware is replaced with the target loader to obtain the target firmware;
- a second obtaining module configured to obtain, based on the initial codebase, a target codebase corresponding to a platform; and
- a first generation module configured to generate the initial firmware based on information about a customization requirement of the platform and the target codebase.

In some embodiments, the startup apparatus 100 may further include:

- a third obtaining module configured to obtain a failure signal of the operating system;
- a fourth obtaining module configured to obtain, based on the failure signal, a running log corresponding to the target loader; and
- a fifth obtaining module configured to obtain, based on the running log, a failure location and a failure attribute that correspond to the failure signal.

In some embodiments, the generation module 130 may be further configured to:

- search for at least one payload in the target loader in parallel according to the hardware initialization complete instruction;
- start the at least one payload in parallel to complete the platform initialization; and
- generate the operating system startup signal.

In some embodiments, the startup apparatus 100 may further include:

- a sixth obtaining module configured to obtain a function mode corresponding to the initial firmware; and
- a seventh obtaining module configured to obtain the target loader based on the function mode.

In some embodiments, the obtaining module 110 may be further configured to:

- select a storage space of a preset size from a specified region of the initial firmware; and
- replace a target feature program in the storage space with Linux binary, and use the Linux binary as the target loader.

With respect to the apparatus in the above embodiments, the specific manner in which each module performs an operation has been described in detail in the embodiments relating to the method, and will not be detailed herein.

Based on the same concept, an embodiment of the present disclosure further provides a computer-readable medium having a computer program stored thereon, where when the program is executed by a processing apparatus, the steps of any antagonistic sample generation method described above are implemented.

Based on the same concept, an embodiment of the present disclosure further provides an electronic device. The electronic device includes:

- a storage apparatus having a computer program stored thereon; and
- a processing apparatus configured to execute the computer program in the storage apparatus to implement the steps of any antagonistic sample generation method described above.

Figure 5:
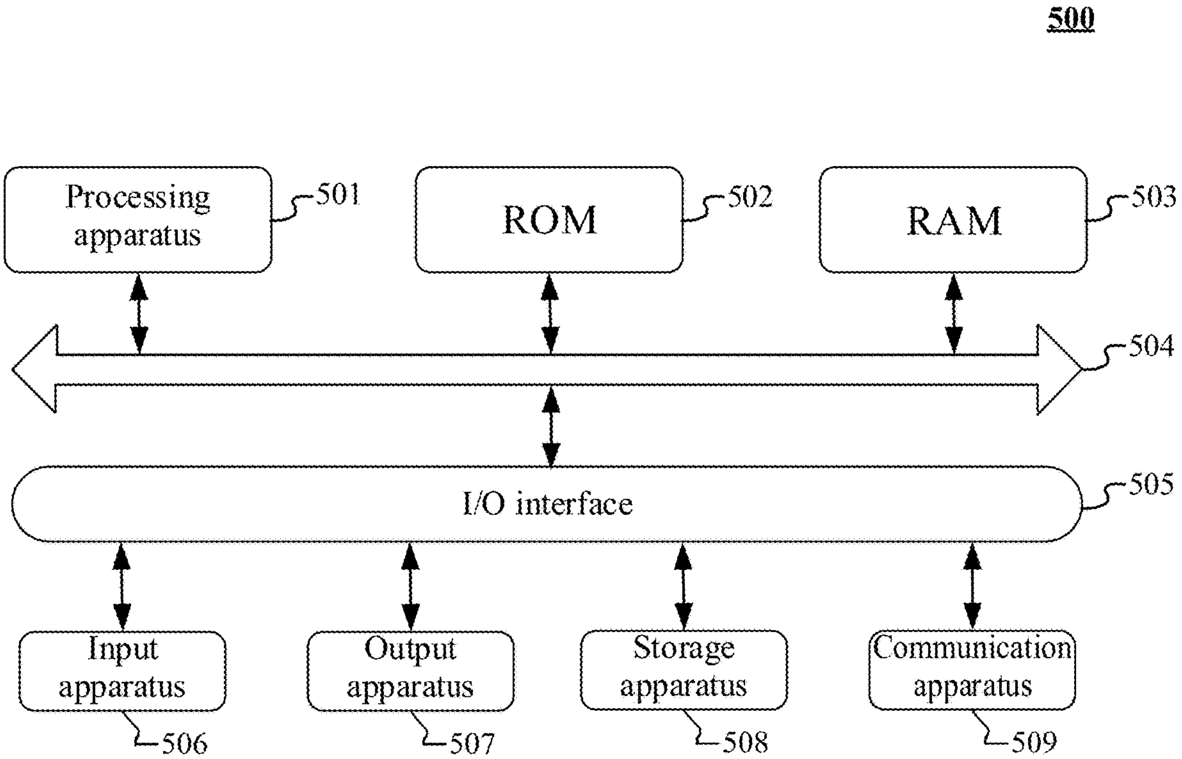
FIG. 5 is a schematic diagram of a structure of an electronic device according to an example embodiment.

Reference is made to FIG. 5 below, which is a schematic diagram of a structure of an electronic device (for example, the terminal device in FIG. 1) 500 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 5 is merely an example, and shall not impose any limitation on the function and scope of use of the embodiments of the present disclosure.

As shown in FIG. 5, the electronic device 500 may include a processing apparatus (e.g., a central processing unit, a graphics processing unit, etc.) 501 that may perform a variety of appropriate actions and processing in accordance with a program stored in a read-only memory (ROM) 502 or a program loaded from a storage apparatus 508 into a random access memory (RAM) 503. The RAM 503 further stores various programs and data required for the operation of the electronic device 500. The processing apparatus 501, the ROM 502, and the RAM 503 are connected to each other through a bus 504. An input/output (I/O) interface 505 is also connected to the bus 504.

Generally, the following apparatuses may be connected to the I/O interface 505: an input apparatus 506 including, for example, a touchscreen, a touchpad, a keyboard, a mouse, a camera, a microphone, an accelerometer, and a gyroscope; an output apparatus 507 including, for example, a liquid crystal display (LCD), a speaker, and a vibrator; the storage apparatus 508 including, for example, a tape and a hard disk; and a communication apparatus 509. The communication apparatus 509 may allow the electronic device 500 to perform wireless or wired communication with other devices to exchange data. Although FIG. 5 shows the electronic device 500 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 509 and installed, installed from the storage apparatus 508, or installed from the ROM 502. When the computer program is executed by the processing apparatus 501, the above functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM) (or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium may send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination thereof.

In some implementations, a client and a server may communicate using any currently known or future-developed network protocol such as a hypertext transfer protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: replace a target feature program in initial firmware with a target loader to obtain target firmware; load hardware code in the target firmware that is used for initializing core hardware to complete hardware initialization, and generate a hardware initialization complete instruction; load the target loader according to the hardware initialization complete instruction to complete platform initialization, and generate an operating system startup signal; and start an operating system based on the operating system startup signal.

The computer program code for performing the operations of the present disclosure may be written in one or more programming languages or a combination thereof, where the programming languages include, but are not limited to, an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user via any kind of network, including a local area network (LAN) or a wide area network (WAN), or may be connected to an external computer (for example, connected via the Internet with the aid of an Internet service provider).

The flowcharts and the block diagrams in the accompanying drawings illustrate possible system architectures, functions, and operations of the system, the method, and the computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that in some alternative implementations, the functions marked in the blocks may also occur in an order different from that marked in the accompanying drawings. For example, two blocks shown in succession may actually be executed substantially in parallel, or may sometimes be executed in a reverse order, depending on a function involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The modules described in the embodiments of the present disclosure may be implemented by means of software, or may be implemented by means of hardware. Names of the modules do not constitute a limitation on the modules in some cases. For example, the first obtaining module may alternatively be described as "a module for obtaining at least two Internet protocol addresses".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include but is not limited to electronic, magnetic, optical, electromagnetic, infrared, or semiconductor systems, apparatus, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

According to one or more embodiments of the present disclosure, Example 1 provides a terminal firmware startup method. The method includes:

replacing a target feature program in initial firmware with a target loader to obtain target firmware;

loading hardware code in the target firmware that is used for initializing core hardware to complete hardware initialization, and generating a hardware initialization complete instruction;

loading the target loader according to the hardware initialization complete instruction to complete platform initialization, and generating an operating system startup signal; and starting an operating system based on the operating system startup signal.

According to one or more embodiments of the present disclosure, Example 2 provides the method of Example 1, where the loading the target loader according to the hardware initialization complete instruction to complete platform initialization, and generating an operating system startup signal includes:

obtaining a target boot loader from the target firmware according to the hardware initialization complete instruction;

obtaining the target loader based on the target boot loader; and loading the target loader to complete the platform initialization, and generating the operating system startup signal.

According to one or more embodiments of the present disclosure, Example 3 provides the method of Example 1, where before the replacing a target feature program in initial firmware with a target loader to obtain target firmware, the method further includes:

obtaining an initial codebase;

obtaining, based on the initial codebase, a target codebase corresponding to a platform; and generating the initial firmware based on information about a customization requirement of the platform and the target codebase.

According to one or more embodiments of the present disclosure, Example 4 provides the method of Example 1, where the method further includes:

obtaining a failure signal of the operating system;

obtaining, based on the failure signal, a running log corresponding to the target loader; and obtaining, based on the running log, a failure location and a failure attribute that correspond to the failure signal.

According to one or more embodiments of the present disclosure, Example 5 provides the method of Example 1, where the loading the target loader according to the hardware initialization complete instruction to complete platform initialization, and generating an operating system startup signal includes:

searching for at least one payload in the target loader in parallel according to the hardware initialization complete instruction;

starting the at least one payload in parallel to complete the platform initialization; and generating the operating system startup signal.

According to one or more embodiments of the present disclosure, Example 6 provides the method of Example 1, where before the replacing a target feature program in initial firmware with a target loader to obtain target firmware, the method further includes:

obtaining a function mode corresponding to the initial firmware; and obtaining the target loader based on the function mode.

According to one or more embodiments of the present disclosure, Example 7 provides the method of Example 1, where the replacing a target feature program in initial firmware with a target loader to obtain target firmware includes:

selecting a storage space of a preset size from a specified region of the initial firmware; and replacing a target feature program in the storage space with Linux binary, and using the Linux binary as the target loader.

According to one or more embodiments of the present disclosure, Example 8 provides a terminal firmware startup apparatus. The apparatus includes:

an obtaining module configured to replace a target feature program in initial firmware with a target loader to obtain target firmware;

a loading module configured to load hardware code in the target firmware that is used for initializing core hardware, and generate a hardware initialization complete instruction;

a generation module configured to load the target loader according to the hardware initialization complete instruction to complete platform initialization, and generate an operating system startup signal; and a startup module configured to start an operating system based on the operating system startup signal.

According to one or more embodiments of the present disclosure, Example 9 provides the apparatus of Example 8, where the generation module 130 is configured to:

obtain a target boot loader from the target firmware according to the hardware initialization complete instruction;

obtain the target loader based on the target boot loader; and load the target loader to complete the platform initialization, and generate the operating system startup signal.

According to one or more embodiments of the present disclosure, Example 10 provides the apparatus of Example 8, where the startup apparatus 100 further includes:

a first obtaining module configured to obtain an initial codebase;

a second obtaining module configured to obtain, based on the initial codebase, a target codebase corresponding to a platform; and a first generation module configured to generate the initial firmware based on information about a customization requirement of the platform and the target codebase.

According to one or more embodiments of the present disclosure, Example 11 provides the apparatus of Example 8, where the startup apparatus 100 may further include:

a third obtaining module configured to obtain a failure signal of the operating system;

a fourth obtaining module configured to obtain, based on the failure signal, a running log corresponding to the target loader; and a fifth obtaining module configured to obtain, based on the running log, a failure location and a failure attribute that correspond to the failure signal.

According to one or more embodiments of the present disclosure, Example 12 provides the apparatus of Example 8, where the generation module 130 may be further configured to:

search for at least one payload in the target loader in parallel according to the hardware initialization complete instruction;

start the at least one payload in parallel to complete the platform initialization; and generate the operating system startup signal.

According to one or more embodiments of the present disclosure, Example 13 provides the apparatus of Example 8, where the startup apparatus 100 may further include:

a sixth obtaining module configured to obtain a function mode corresponding to the initial firmware; and a seventh obtaining module configured to obtain the target loader based on the function mode.

According to one or more embodiments of the present disclosure, Example 14 provides the apparatus of Example 8, where the generation module 130 may be further configured to:

select a storage space of a preset size from a specified region of the initial firmware; and replace a target feature program in the storage space with Linux Binary, and use the Linux Binary as the target loader.

According to one or more embodiments of the present disclosure, Example 15 provides a computer-readable medium having a computer program stored thereon, where when the program is executed by a processing apparatus, the steps of the method according to any one of Examples 1 to 7 are implemented.

According to one or more embodiments of the present disclosure, Example 16 provides an electronic device. The electronic device includes:

a storage apparatus having a computer program stored thereon; and a processing apparatus configured to execute the computer program in the storage apparatus to implement the steps of the method according to any one of Examples 1 to 7.

The foregoing descriptions are merely preferred embodiments of the present disclosure and explanations of the applied technical principles. A person skilled in the art should understand that the scope of disclosure involved in the present disclosure is not limited to the technical solutions formed by specific combinations of the above technical features, and shall also cover other technical solutions formed by any combination of the above technical features or equivalent features thereof without departing from the above concept of disclosure. For example, a technical solution formed by a replacement of the above features with technical features with similar functions disclosed in the present disclosure (but not limited thereto) also falls within the scope of the present disclosure.

In addition, although the various operations are depicted in a specific order, it should be understood as requiring these operations to be performed in the specific order shown or in a sequential order. Under specific circumstances, multitasking and parallel processing may be advantageous. Similarly, although several specific implementation details are included in the foregoing discussions, these details should not be construed as limiting the scope of the present disclosure. Some features that are described in the context of separate embodiments may alternatively be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims. With respect to the apparatus in the above embodiments, the specific manner in which each module performs an operation has been described in detail in the embodiments relating to the method, and will not be detailed herein.

The invention claimed is:

1. A terminal firmware startup method, comprising:

replacing a target feature program in initial firmware with a target loader to obtain target firmware;

loading hardware code in the target firmware that is used for initializing core hardware to complete hardware initialization, and generating a hardware initialization complete instruction;

loading the target loader according to the hardware initialization complete instruction to complete platform initialization, and generating an operating system startup signal, wherein, generating the operating system startup signal comprises determining whether the target firmware found a plurality of payloads in parallel to perform multi-core parallel computing; and starting an operating system according to the operating system startup signal, wherein the target feature program comprises a feature program in a function module of the initial firmware and is stored in a firmware region of the initial firmware.

2. The startup method according to claim 1, wherein the loading the target loader according to the hardware initialization complete instruction to complete platform initialization, and generating an operating system startup signal comprises:

obtaining a target boot loader from the target firmware according to the hardware initialization complete instruction;

obtaining the target loader based on the target boot loader; and loading the target loader to complete the platform initialization, and generating the operating system startup signal.

3. The startup method according to claim 1, wherein before the replacing a target feature program in initial firmware with a target loader to obtain target firmware, the method further comprises:

obtaining an initial codebase;

obtaining, based on the initial codebase, a target codebase corresponding to a platform; and generating the initial firmware based on information about a customization requirement of the platform and the target codebase.

4. The startup method according to claim 1, further comprising:

obtaining a failure signal of the operating system;

obtaining, based on the failure signal, a running log corresponding to the target loader; and obtaining, based on the running log, a failure location and a failure attribute that correspond to the failure signal.

5. The startup method according to claim 1, wherein the loading the target loader according to the hardware initialization complete instruction to complete platform initialization, and generating an operating system startup signal comprises:

searching for at least one payload in the target loader in parallel according to the hardware initialization complete instruction;

starting the at least one payload in parallel to complete the platform initialization; and generating the operating system startup signal.

6. The startup method according to claim 1, wherein before the replacing a target feature program in initial firmware with a target loader to obtain target firmware, the method further comprises:

obtaining a function mode corresponding to the initial firmware; and obtaining the target loader based on the function mode.

7. The startup method according to claim 1, wherein the replacing a target feature program in initial firmware with a target loader to obtain target firmware comprises:

selecting a storage space of a preset size from the firmware region of the initial firmware; and replacing a target feature program in the storage space with Linux binary, and using the Linux binary as the target loader.

8. An electronic device, comprising:

a storage apparatus having one or more computer programs stored thereon; and one or more processing apparatuses configured to execute the one or more computer programs in the storage apparatus to implement a terminal firmware startup method, and the terminal firmware startup method comprises:

replacing a target feature program in initial firmware with a target loader to obtain target firmware;

loading hardware code in the target firmware that is used for initializing core hardware to complete hardware initialization, and generating a hardware initialization complete instruction;

loading the target loader according to the hardware initialization complete instruction to complete platform initialization, and generating an operating system startup signal, wherein, generating the operating system startup signal comprises determining whether the target firmware found a plurality of payloads in parallel to perform multi-core parallel computing; and starting an operating system according to the operating system startup signal, wherein the target feature program comprises a feature program in a function module of the initial firmware and is stored in a firmware region of the initial firmware.

9. The electronic device according to claim 8, wherein the loading the target loader according to the hardware initialization complete instruction to complete platform initialization, and generating an operating system startup signal comprises:

obtaining a target boot loader from the target firmware according to the hardware initialization complete instruction;

obtaining the target loader based on the target boot loader; and loading the target loader to complete the platform initialization, and generating the operating system startup signal.

10. The electronic device according to claim 8, wherein before the replacing a target feature program in initial firmware with a target loader to obtain target firmware, the terminal firmware startup method further comprises:

obtaining an initial codebase;

obtaining, based on the initial codebase, a target codebase corresponding to a platform; and generating the initial firmware based on information about a customization requirement of the platform and the target codebase.

11. The electronic device according to claim 8, wherein the terminal firmware startup method further comprises:

obtaining a failure signal of the operating system;

obtaining, based on the failure signal, a running log corresponding to the target loader; and obtaining, based on the running log, a failure location and a failure attribute that correspond to the failure signal.

12. The electronic device according to claim 8, wherein the loading the target loader according to the hardware initialization complete instruction to complete platform initialization, and generating an operating system startup signal comprises:

searching for at least one payload in the target loader in parallel according to the hardware initialization complete instruction;

starting the at least one payload in parallel to complete the platform initialization; and generating the operating system startup signal.

13. The electronic device according to claim 8, wherein before the replacing a target feature program in initial firmware with a target loader to obtain target firmware, the terminal firmware startup method further comprises:

obtaining a function mode corresponding to the initial firmware; and obtaining the target loader based on the function mode.

14. The electronic device according to claim 8, wherein the replacing a target feature program in initial firmware with a target loader to obtain target firmware comprises:

selecting a storage space of a preset size from the firmware region of the initial firmware; and replacing a target feature program in the storage space with Linux binary, and using the Linux binary as the target loader.

15. A non-transitory computer-readable medium having a computer program stored thereon, wherein when the program is executed by a processing apparatus, a terminal firmware startup method is implemented, and the terminal firmware startup method comprises:

replacing a target feature program in initial firmware with a target loader to obtain target firmware;

loading hardware code in the target firmware that is used for initializing core hardware to complete hardware initialization, and generating a hardware initialization complete instruction;

loading the target loader according to the hardware initialization complete instruction to complete platform initialization, and generating an operating system startup signal, wherein, generating the operating system startup signal comprises determining whether the target firmware found a plurality of payloads in parallel to perform multi-core parallel computing; and starting an operating system according to the operating system startup signal, wherein the target feature program comprises a feature program in a function module of the initial firmware and is stored in a firmware region of the initial firmware.

16. The non-transitory computer-readable medium according to claim 15, wherein before the replacing a target feature program in initial firmware with a target loader to obtain target firmware, the terminal firmware startup method further comprises:

obtaining a function mode corresponding to the initial firmware; and obtaining the target loader based on the function mode.

17. The non-transitory computer-readable medium according to claim 15, wherein the loading the target loader according to the hardware initialization complete instruction to complete platform initialization, and generating an operating system startup signal comprises:

obtaining a target boot loader from the target firmware according to the hardware initialization complete instruction;

obtaining the target loader based on the target boot loader; and loading the target loader to complete the platform initialization, and generating the operating system startup signal.

18. The non-transitory computer-readable medium according to claim 15, wherein before the replacing a target feature program in initial firmware with a target loader to obtain target firmware, the terminal firmware startup method further comprises:

obtaining an initial codebase;

obtaining, based on the initial codebase, a target codebase corresponding to a platform; and generating the initial firmware based on information about a customization requirement of the platform and the target codebase.

19. The non-transitory computer-readable medium according to claim 15, wherein the terminal firmware startup method further comprises:

obtaining a failure signal of the operating system;

obtaining, based on the failure signal, a running log corresponding to the target loader; and obtaining, based on the running log, a failure location and a failure attribute that correspond to the failure signal.

20. The non-transitory computer-readable medium according to claim 15, wherein the loading the target loader according to the hardware initialization complete instruction to complete platform initialization, and generating an operating system startup signal comprises:

searching for at least one payload in the target loader in parallel according to the hardware initialization complete instruction;

starting the at least one payload in parallel to complete the platform initialization; and generating the operating system startup signal.

* * * * *